United States Patent [19]

Warner

[11] Patent Number: 4,581,851

[45] Date of Patent: Apr. 15, 1986

[54] WINDOW ARRANGEMENT HAVING A PANE WHICH IS ADJUSTABLE IN HEIGHT, PARTICULARLY FOR MOTOR VEHICLES

[75] Inventor: Hermann Warner, Trebur, Fed. Rep. of Germany

[73] Assignee: General Motors Corporation, Detroit, Mich.

[21] Appl. No.: 593,905

[22] Filed: Mar. 27, 1984

[30] Foreign Application Priority Data

Apr. 7, 1983 [DE] Fed. Rep. of Germany ..... 33124728

[51] Int. Cl.⁴ .............................................. E05F 11/38
[52] U.S. Cl. ........................................ 49/374; 49/502
[58] Field of Search .................. 49/440, 441, 374, 502

[56] References Cited

U.S. PATENT DOCUMENTS 4,457,111  7/1984  Koike ................................ 49/502 X
4,490,942  1/1985  Arheim et al. ........................ 49/374
4,494,337  1/1985  Watanabe et al. ..................... 49/374

Primary Examiner—Kenneth Downey
Attorney, Agent, or Firm—William A. Schuetz

[57] ABSTRACT

A window arrangement including a vertically adjustable window which is disposed flush with the adjacent body panels providing simplified manufacture and assembly and improved retention of the window sealing and guide strip in the window frame. For this purpose, the window sealing strip and the window guide strip are in the form of separate elongate elastic members. Each elongate elastic member is of a cross-sectional configuration that includes an essentially triangular hollow portion, one side of which being adapted for insertion into a channel of the window frame so as to be retained therein by compression.

5 Claims, 5 Drawing Figures

WINDOW ARRANGEMENT HAVING A PANE WHICH IS ADJUSTABLE IN HEIGHT, PARTICULARLY FOR MOTOR VEHICLES

The invention relates to a window arrangement including a vertically adjustable window pane, especially adapted for use in motor vehicles. The window pane is disposed so as to be flush with the adjacent body panels, and its guide means as well as its sealing strip are disposed on the pane inboard side. The window guide means is extending along the window frame, and an elongate elastic guide member is interposed therebetween.

In an arrangement according to the earlier patent application U.S. Ser. No. 456,139 (P 32 00 322.6), the window sealing strip and the guide member are in the form of one single elongate member. Past experience has shown that it is relatively difficult to secure an elongate elastomeric member of this type to the window frame. Furthermore, the profiled member described in this patent application is complicated in design and expensive to manufacture and assemble since, in most instances, its application requires the use of an additional reinforcing member.

It is the object of the present invention to provide a window sealing trip and a window guide member with a view towards simplicity of manufacture and assembly. It is another object of the invention to provide that the corner pieces to be employed at the transition between the vertical and horizontal portion of the window frame be of a type that are suitable for economical manufacture.

In accordance with the present invention, the window sealing strip and the profiled guide member cooperating with the guide means (channel) are in the form of separate elongate elastomeric members and are separately retained within the window frame.

Preferably, the cross sectional configuration of each of the two elongate elastomeric members is such that they can be form and/or force-lockingly or force fittedly secured to a window frame provided with a suitable cross-sectional configuration of its own. Furthermore, each elastomeric member is provided with a lip which is adapted to cover the surface of the window frame disposed towards the window frame, i.e., the two lips are partially overlapping one another. This will enable, in combination with the cross sectional configuration of the window frame, the window sealing strip and/or the profiled guide member to be assembled in a relatively simple fashion, and their manufacture will be relatively simple. The lip provided on the elastomeric members serves as a means to conceal the side of the window frame facing the window pane, so that the surface visible from the outside appears even and uniform.

The objective of securing the elastomeric sealing strip and the elastomeric guide member to the window frame in a manner that is not only relatively simple, but which also provides that the elongate elastomeric members do not readily separate from the window frame, can be achieved in that the elongate elastomeric member is of triangular hollow cross-sectional configuration, one side thereof being fitted diagonally into a recess of the window frame by push-in insertion. In order to provide a proper fit of the elongate elastomeric member on the window frame, the triangular hollow body may have the form of a right-angled triangle whose diagonal side is extending diagonally within a U-channel section of the window frame, and whose outwardly directed end is abutting against a raised portion in the U-channel, while the inwardly directed end is disposed towards the sealing lip or bead. This arrangement provides that the sealing lip and/or the sealing bead, when subjected to a pulling force, as may occur, for instance, with the window pane being frozen to the elastomeric member, will not readily dislodge from the window frame. This method of installation is suitable for all elastomeric strips that are retained on only one side.

In addition to or instead of this type of securement, the side of the hollow profile engaging the flange may also be provided with a lip which is adapted to engage with a projection in the flange, especially a bead.

Preferably, the upper edge of the window frame section is such that, in addition to the sealing strip, which corresponds to the vertical portion, there is provided another elongate elastic member which serves as the upper stop for the window pane and which closes and seals the gap between the window pane and the vehicle body.

The invention will be described by way of several exemplary embodiments with reference to the accompanying drawings, wherein.

Figure 1:
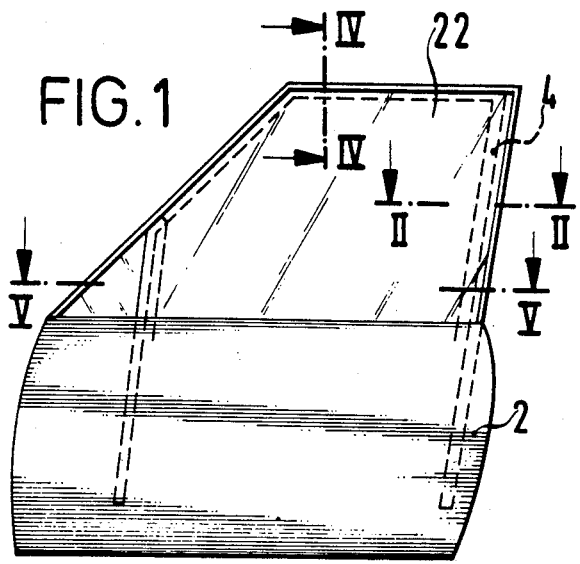
FIG. 1 is a side elevation of a vehicle door.
Figure 2:
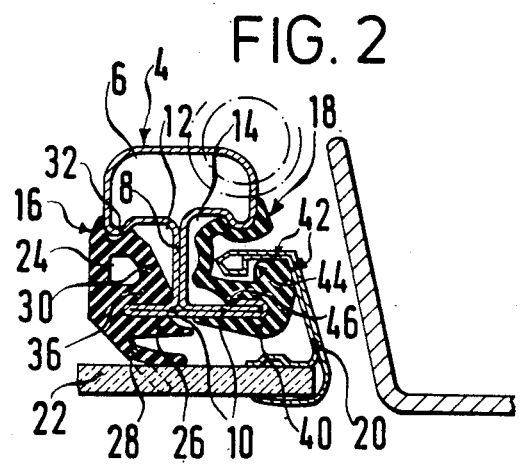
FIG. 2 is a sectional view taken along line II—II of FIG. 1.

Referring to FIG. 1, the vehicle door is provided with an inwardly disposed window frame 4, the lateral portions of which are extending downwardly between the inner and outer door panel. The window pane 22 is guided along the window frame 4. The window frame is comprised of a rolled steel section, and its cross section may be of a configuration illustrated in FIG. 2, comprising a tubular member 6 and including a bridge portion 8 terminating in a pair of perpendicularly extending flanges 10. Each flange 10 is forming, in combination with the respective side of the tubular member, a U-channel or cavity 12 and 14 respectively. As illustrated in FIG. 2, the elongate elastic member 16 serving as the window seal is disposed on the left hand side of the window frame 4, while a separate elongate elastic member 18 serving as a guide member is disposed on the right hand side of the window frame 4 and is cooperating with the guide channel 20 attached to the window pane 22.

Figure 3:
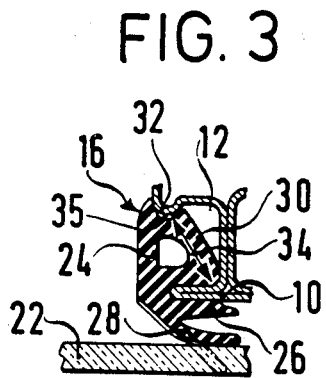
FIG. 3 is a detail of FIG. 2.

The elongate elastic member 16 serving as a window sealing element is comprised essentially of a triangular hollow body 24, a lip 26 and a sealing lip 28. The lip 26 engages the outer side of flange 10 of the window frame 4, whereas the sealing lip 28, which may also be in the form of a bead, is engaging the window pane 22. The triangular hollow body has a diagonally extending wall or side 30, which is inserted into the U-shaped channel member 12 such that the end extending furthermost into the channel 12 is disposed proximate the sealing lip 28. The other outer end of the diagonal wall 30 engages a raised portion 32 of the tubular member 6, i.e., is forming a recess or hollow space 35, as illustrated in FIG. 3. Thus, the hollow body 24 is force fittedly secured to the channel 12 so that the diagonal wall 30 is biased outwardly in the recess 12 as indicated by the arrow 34 in FIG. 3. Side 36 of the triangular cross section 24 is engaging the flange 10. This particular disposition of the diagonal web 30 in the recess 12 ensures that the sealing strip cannot easily be pulled away from the window frame 4 by a force originating at the side of the sealing lip 28. Lip 26 extends about half-way over the two flanges 10 and could be arranged to be in overlapping engagement with the lip 40 of the elongate elastic member 18, which would provide that the window frame 4, i.e., flange 10, is completely concealed when viewed from the outside. Portion 36 of the sealing strip is biased by the web 30 against the flange 10, so as to retain the weather strip in frictional engagement therewith and to ensure that the weather strip is not dislodged therefrom upon movment of the window pane even under environmental conditions that cause the sealing strip to be frozen to the window pane.

The elongate extruded elastic guide member 18 is shaped as a channel strip for the guide rail 20, i.e., it is provided with guide surfaces 42 adapted to cooperate with guide rail 20, as well as an undercut portion 44. The extruded guide member 18 is retained on the window frame 4 by, among other things, the lip 46 which is adapted to engage with a bead-like edge of the flange 10 of the window frame.

Figure 4:
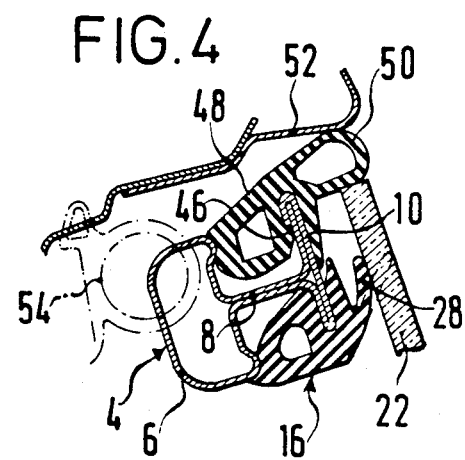
FIG. 4 is a sectional view taken along line IV—IV of FIG. 1.

The elongate elastic member 16 of the window seal does not only extend along the lateral edge of the window pane 22, but is also provided for the upper edge of the window frame, i.e., it is also disposed on the upper portion of the window frame 4. This arrangement is illustrated in FIG. 4, which is a sectional view along line IV—IV of FIG. 1. It is apparent that the elongate elastic member 16 is of the same cross-sectional configuration as in FIG. 2. Instead of the elongate elastic member 18 there is provided an additional sealing strip 48. This sealing strip is secured to the window frame 4 in a manner similar to the elongate elastic member 18, i.e., it is also provided with a lip 46 which engages a bead-like edge of flange 10. The sealing strip 48 is provided with a bead 50 which serves as the upper stop for the window pane 22 and as a means of sealing and closing the gap between the window and the vehicle body. The adjacent body panel is denoted by the numeral 52 and the door sealing strip by the numeral 54. The bead 50 of the sealing strip 48 is flush with the window pane 22 which, by means of the bead 50, is also protected when moved into its upper position.

Figure 5:
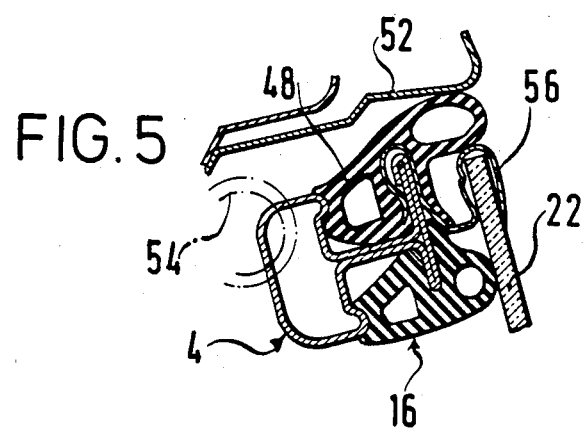
FIG. 5 is also a sectional view taken along line IV—IV illustrating a modified form of the arrangement.

FIG. 5 shows another embodiment of the invention which is similar to that illustrated in FIG. 4, and therefore equivalent parts are designated by the same numerals. As in the arrangements described in the foregoing, the elastic strips 16 and 48 are self-lockingly retained on the window frame 4. The strip 48 is joined on the corner of the B and C column with the strip 18 by means of a formed part. The profiles in this as well as in the other figures are of relatively small cross-section and therefore render an optically pleasing appearance. The window pane 22 shown in FIG. 5 is one that is fixed. Here, a support channel 56 is disposed between the window pane 22 and the window frame 4. This arrangement may become necessary when the gap between the window pane 22 and the window frame is too wide, which would facilitate unauthorized access to the vehicle. The channel 56 is secured to the window frame by bonding and is pushed over the window frame during assembly. It is apparent from FIG. 5 that the invention is also applicable in conjunction with fixed windows. The cross-sectional configuration according to FIG. 5 would also be suitable for the vertical portion of the window frame.

The embodiment of the invention in which an exclusive property or privilege is claimed are defined as follows:

1. In a door for an automotive vehicle having a window frame means for supporting a vertically adjustable window pane which is adapted to be substantially flush with adjacent body parts of the vehicle, said window frame means being disposed wholly inwardly of the window pane and comprising a body portion, a bridge poetion extending transversely of the body portion and a pair of oppositely facing flange portions extending transversely of the bridge portion at its end remote from the body portion, said body portion, bridge portion and flange portions defining a pair of oppositely facing channels, an elongated guide means disposed within and connected to said one of said channels, a guide means secured to a side edge portion of said window pane and which is slidably received within said one channel, and an elongated elastomeric sealing means carried by said other of said channels of said window frame means and being located inwardly of said side edge of said window pane, said sealing means including a first flexible sealing lip for engaging said window pane on its interior side to provide a seal between said window pane and said window frame means, characterized in that said elastomeric sealing means includes a generally hollow body which is force fitted in said other channel between the body portion and adjacent flange portion of said window frame means whereby said body is compressed and exerts an outward compressive force against said body portion and adjacent flange portion of said window frame means and a second integral lip means located between said first sealing lip and said body of said sealing means and which engages the adjacent flange portion of said window frame means on its side opposite the body of the sealing means whereby said sealing means is retained on said window frame means and said adjacent flange portion of said window frame means is substantially hidden from view.

2. In a vehicle door, as defined in claim 1, and wherein said body of said sealing means is of a hollow triangular cross-sectional shape having a side extending diagonally in said channel whereby said compressive forces are exerted diagonally outwardly against said other channel.

3. In a vehicle door, as defined in claim 2, and wherein said hollow triangularly shaped body of said sealing means has another side engaging said adjacent flange portion of said window frame means defining part of said other channel and which extends coextensive with the depth of said other channel.

4. In a vehicle door, as defined in claim 3, and wherein said window frame means is a rolled steel section.

5. In a vehicle door, as defined in claim 3, and wherein said body portion of said window frame means includes a raised portion extending within said other channel for engaging said body of said sealing means to further retain said sealing means on said window frame means.

* * * * *